United States Patent [19]

Laarm

[11] 3,930,631

[45] Jan. 6, 1976

[54] MOUNTING DEVICE PARTICULARLY FOR CEILING OR WALL FITTINGS

[76] Inventor: Sven Laarm, Husarvagen 1c, S-230 50 Bjarred, Sweden

[22] Filed: Nov. 4, 1974

[21] Appl. No.: 520,316

[52] U.S. Cl. .................................... 248/343; 52/28

[51] Int. Cl.$^2$.... F21S 1/02; F21S 1/06; F16M 13/00

[58] Field of Search ........... 248/342, 343, 344, 345; 52/28 R, 718, 698; 24/221 R; 85/5 P

[56] References Cited

UNITED STATES PATENTS

| | | | |
|---|---|---|---|
| 1,215,838 | 2/1917 | Negus | 248/345 UX |
| 1,507,758 | 9/1924 | Scott | 248/345 |
| 1,551,914 | 10/1924 | Savory | 248/343 UX |
| 1,557,515 | 10/1925 | Wooley | 248/343 |
| 2,239,125 | 4/1941 | Summers | 85/5 P |
| 3,407,454 | 10/1968 | Myatt | 24/221 R |

*Primary Examiner*—J. Franklin Foss
*Attorney, Agent, or Firm*—Ladas, Parry, Von Gehr, Goldsmith & Deschamps

[57] ABSTRACT

A mounting device, particularly for ceiling or wall fittings, comprising a first member adapted to engage a means of attachment provided in a mounting surface by means of a fastening device whereby said first member will bear against said mounting surface, and a second member having means for engagement with a complementary attachment device of said first member said fastening device having a groove provided in said first member and inclined in relation to said mounting surface to gradually engage said means of attachment when said first member is being secured to said mounting surface.

7 Claims, 6 Drawing Figures

MOUNTING DEVICE PARTICULARLY FOR CEILING OR WALL FITTINGS

The present invention refers to a mounting device, particularly for ceiling or wall fittings of a type comprising a first member to bear against a mounting surface and a second member to be in engagement with said first member. According to one embodiment of the present invention, said first member is secured to the mounting surface by means of an inclined groove in said first member to which a means of attachment, for instance a hook in the ceiling, is rigidly secured. The second member is then screwed or snapped on to said first member.

When mounting fittings, in particular ceiling fittings, a housing made from plastics material or the like is normally used, having a through hole to receive a current supply cable, and some form of suspension means, comprising for instance a clutch or the like, adapted to be engaged with a hook provided in the mounting surface (the ceiling). The hole may be tapered and oval whereby locking is effected by a wedging action, or the hole may be rounded and provided with a socket-like device having a locking screw for locking the housing with respect to the cable and/or the mounting surface.

Since, however, in many cases the cable of the fittings will be somewhat too long, the problem will arise, that the surplus length of the cable must be more or less squeezed into the housing, which entails excessive strain on the screw. The result of this may be that the housing will slide down the cable, thereby forming an intermediate space between the housing and the mounting surface. The cable may extrude out of this intermediate space and the mounting of the housing may be inclined. When the circuit is closed, there will also be a certain heat release in the cable with the result that the covering of the cable may soften and the housing may slide down along the cable, resulting in a certain play between the housing and the mounting surface.

At present there is obviously a great need for a simple, cheap and effective mounting for ceiling or wall fittings.

It is the object of the present invention to solve the problems pertinent to conventional mountings. Therefore the mounting according to the present invention is formed of two members, of which a first member is adapted to engage in a simple but safe manner a means of attachment, for instance a hook, existing or arranged in a mounting surface, a second member preferably being formed as a housing and having means to engage a complementary attachment device of said first member, so that the two members will be in safe engagement with each other. Said members are adapted in a manner requiring no tools for mounting the two members. If the mounting surface is already provided with a means of attachment, for instance a hook, no tools will be required even for the mounting of said first member.

The mounting may be made from plastics material. Since the construction is of a very simple type and since there is a great need for a mounting of the type in question, very extensive series of the mounting may be produced. This would imply reduced costs for manufacture.

A great many modifications of the construction are possible to make without departing from the scope of the present invention and one of these embodiments will be described in the following with reference to the attached drawings to elucidate the invention.

Figure 1:
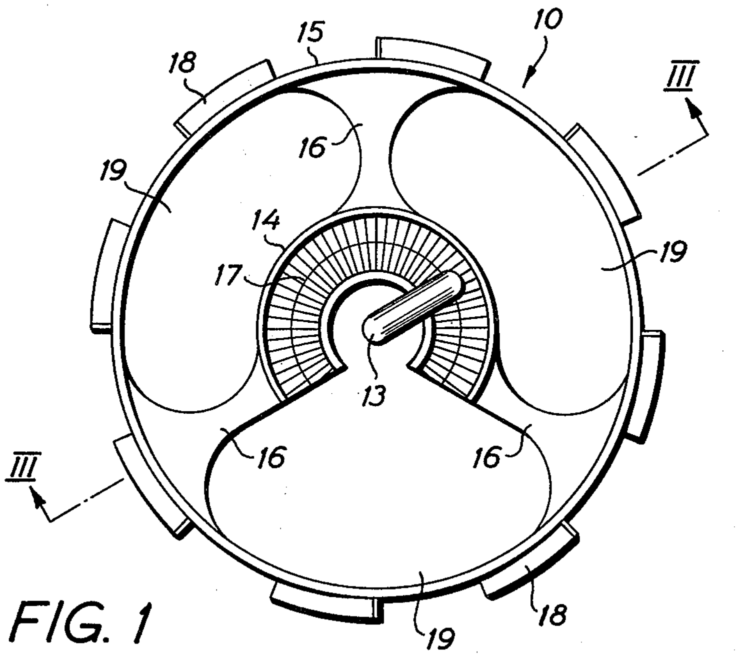
FIG. 1 shows a plan view of the first member of the embodiment of the mounting according to the present invention.
Figure 2:
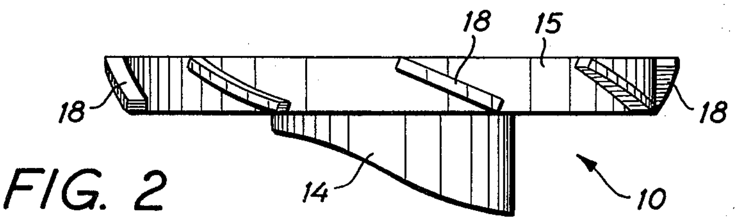
FIG. 2 is an elevation view of said first member.
Figure 3:
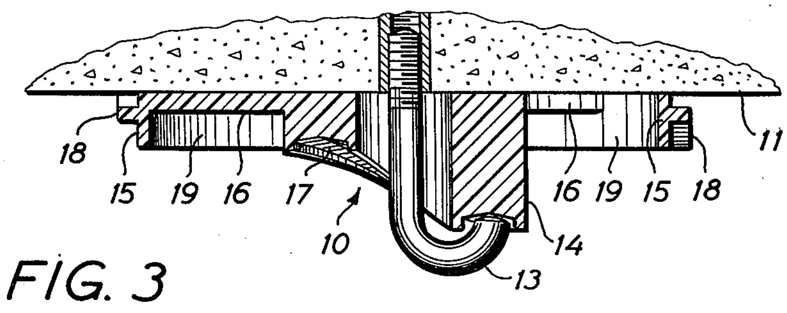
FIG. 3 is a sectional view of said first member along the line III—III of FIG. 1, with the member bearing against the mounting surface.
Figure 6:
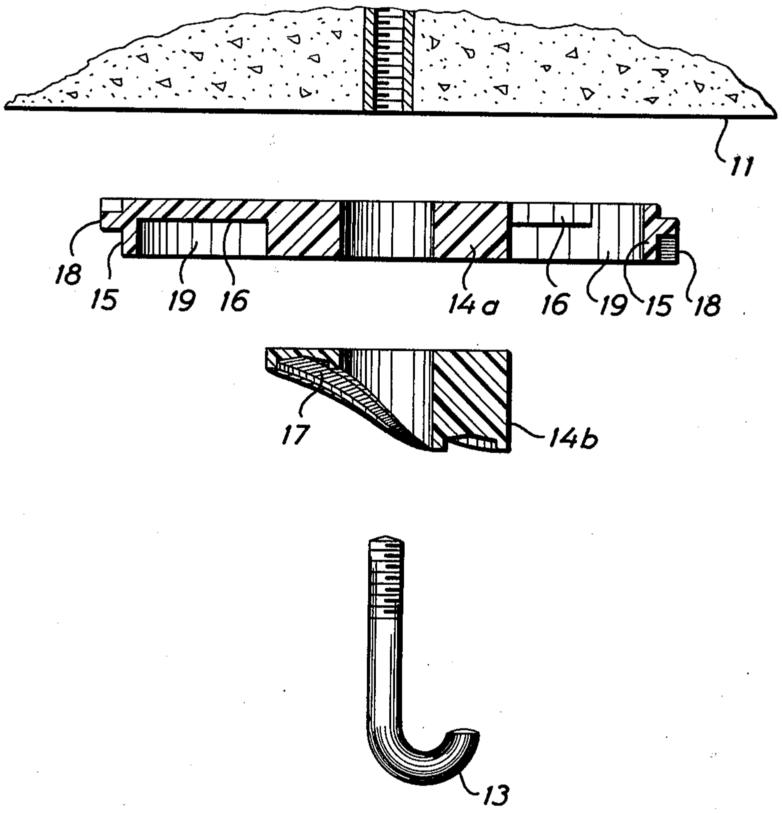

FIG. 6 shows a view similar to FIG. 3 but in exploded form of a modification of the structure shown in FIGS. 1, 2 and 3. The first member 10 included in the illustrated embodiment of the present invention is adapted to be secured to a ceiling 11 by means of a hook 13 existing or arranged at a place of mounting in the ceiling. Said first member 10 comprises at least two integral constituent members 14, 15 and 16.

The central constituent member 14 is preferable adapted as a helix, running about a centrally disposed hole. The radial cross section of the helix has a shallow V-shape. This V-shaped groove 17 is also provided with radially extending corrugations, thereby reinforcing the engagement with the hook 13.

According to the modification shown in FIG. 6 the central constituent member 14 is formed as a flat plate, **14*a* bearing against a further member 14*b* . This further member 14*b* may be an elastic washer or a plate, the height of which will be increased along the circumference and which will press said first member 14 *a*** against said mounting surface when in engagement with the hook in the mounting surface.

The constituent member 15 on which a member of flanges 18 are arranged, has an annular shape. These flanges 18 are preferably rather inclined and may also be provided with corrugations to provide safe engagement without excessive rotation of said second member.

The constituent members 14 and 15 (**14*a* and 15 in the case of FIG. 6) are connected by three bridges 16.**

Figure 5:
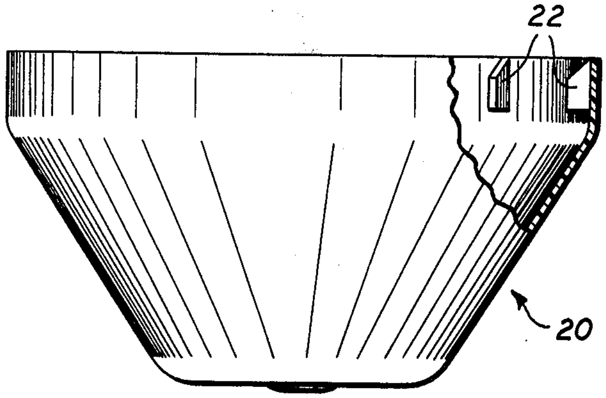
FIG. 5 is in part an elevation view of said second member and in part a cut-away view along the line of FIG. 4 IV-IV, said second member being in engagement with said first member bearing against the mounting surface.
Figure 4:
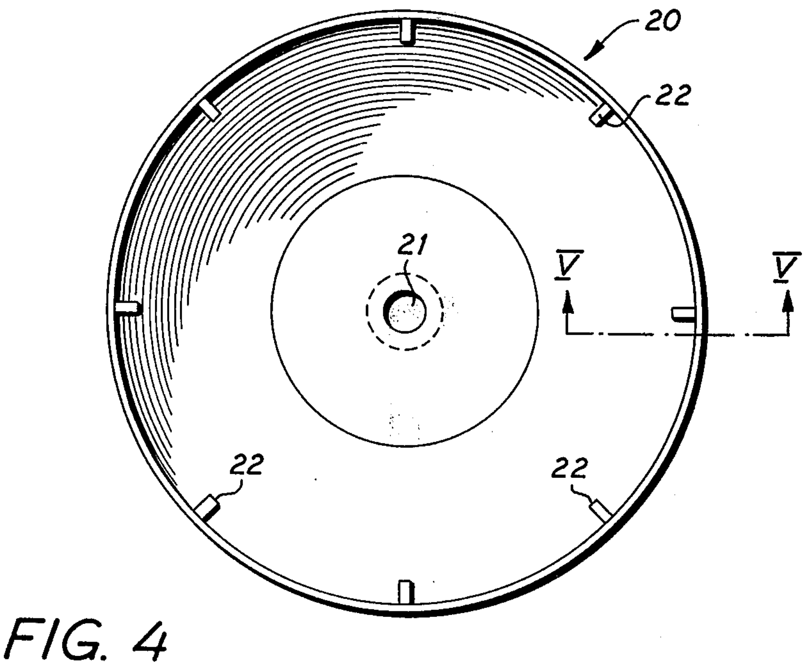
FIG. 4 is a plan view of the second member.

The second member 20 of the mounting device is shown in the figures 4 and 5. Said member can be formed substantially as a housing of a conventional type with a through opening 21 for the current supply cable of the fittings. Said housing 20 has banes 22 provided on its internal side for engagement with the inclined flanges 18 of said first member 10.

According to a second embodiment of the invention (not shown) said attachment device 18, 22 may be arranged as a snapping device.

The mounting takes place as follows: The hook 13 existing or arranged in the ceiling is turned to face the electrical contact in the ceiling. The first member is now threaded on in such a manner that the contact will be in the space 19 of said first member 10. Also said hook 13 is placed att the beginning of said groove 17. The hook 13 is now rotated in the direction upwards the helical groove 17, whereby said first member 10 is secured to the ceiling 11. The corrugations in the groove 17 prevent undesirable turning back of the hook 17.

Said second member 20 is then mounted in a conventional way as far as the current supply cable is concerned, whereupon the eletrical contact is connected. The housing 20 is then approached to the ceiling, and the vanes 22 are brought into engagement with the flanges 18, whereby the housing 20 will be locked to the ceiling and will effectively enclose surplus cable. Thereby a potential play or inclination between the housing 20 and the ceiling 11 will be obviated. Thus a most stable and reliable mounting will be obtained.

As mentioned above, a great many modifications are possible to make within the scope and spirit of the present invention. For instance, said first and second members 10 and 20 need not be cylindrical but all other conceivable profiles are possible.

The snapping mounting device is preferred but other locking devices for instance a mannetical locking device are also possible. Even if the embodiment heretofore described relates to a mounting for ceiling fittings, it will be recognized that said mounting can be used also for mounting wall fittings or other electrical and mechanical devices. In ceiling fittings a very simple, cheap and attractive installation is obtained.

It is obvious that the disclosures relating to the special embodiment of the present invention and what is shown in the drawing are only to be regarded as examples of a possible embodiment and that a great many variations and modifications can be made without departing from the scope and spirit of the invention as defined in the attached patent claims.

What I claim is:

1. A mounting device for a ceiling or wall fitting, comprising a first member adapted to engage attachment means disposed in a mounting surface, and a second member having means to engage complementary attachment portions of said first member for bringing said first and second members into positive engagement with each other, said first member being formed with a groove which follows a helical path around said attachment means so that rotation of said first member is one sense about said attachment means brings said attachment means gradually into firm engagement with said first member to urge said first member against said mounting surface.

2. A mounting device as claimed in claim 1, wherein said groove is provided with radially extending corrugations.

3. A mounting device as claimed in claim 1, wherein said complementary attachment portions include inclined flanges provided in said first member, said second member including vanes as said means to engage the complementary attachement portions.

4. A mounting device for a ceiling or wall fitting, comprising a first member adapted to engage a mounting surface, a second member having means to engage complementary attachment portions of said first member for bringing said first and second members into positive engagement with each other, and a fastening device adapted to be interposed between said first member and attachment means disposed in the mounting surface, said fastening device being formed with a groove which follows a helical path around said attachment means so that rotation of said fastening device in one sense about said attachment means brings said attachment means gradually into firm engagement with said fastening device to urge said fastening device against said first member and said first member against said mounting surface.

5. A mounting device as claimed in claim 4, wherein said groove is provided with radially extending corrugations.

6. A mounting device as claimed in claim 4, wherein said fastening device is an elastic washer.

7. A mounting device as claimed in claim 4, wherein said complementary attachment portions include inclined flanges provided in said first member, said second member including vanes as said means to engage the complementary attachment portions.

* * * * *